(12) United States Patent
Cox et al.

(10) Patent No.: US 9,627,874 B2
(45) Date of Patent: Apr. 18, 2017

(54) MOUNTING DEVICE AND METHOD OF ASSEMBLING THE SAME

(71) Applicant: Unison Industries, LLC, Jacksonville, FL (US)

(72) Inventors: Adam Benjamin Cox, Saint Johns, FL (US); William Ward Owens, Jacksonville, FL (US); Joseph W. Chvala, Ponte Vedra, FL (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 820 days.

(21) Appl. No.: 13/963,712

(22) Filed: Aug. 9, 2013

(65) Prior Publication Data

US 2014/0069691 A1 Mar. 13, 2014

Related U.S. Application Data

(60) Provisional application No. 61/700,229, filed on Sep. 12, 2012.

(51) Int. Cl.
*H02G 3/32* (2006.01)
*H02G 1/04* (2006.01)
*F02C 7/00* (2006.01)

(52) U.S. Cl.
CPC .......... *H02G 3/32* (2013.01); *F02C 7/00* (2013.01); *H02G 1/04* (2013.01); *Y10T 29/49117* (2015.01)

(58) Field of Classification Search
CPC .... F02C 7/00; H02G 1/04; H02G 3/32; Y10T 29/49117
USPC ............... 174/89–93, 94 R, 94 S, 84 S, 135
See application file for complete search history.

(56) References Cited

U.S. PATENT DOCUMENTS

| | | | |
|---|---|---|---|
| 4,750,265 A | 6/1988 | Watanabe et al. | |
| 6,248,952 B1 | 6/2001 | Reeves et al. | |
| 6,627,817 B1 * | 9/2003 | Kortenbach | H02G 3/083 174/541 |
| 6,875,918 B2 * | 4/2005 | Sudo | H02G 3/06 138/108 |
| 7,966,832 B1 | 6/2011 | Lockyer et al. | |

(Continued)

OTHER PUBLICATIONS

The Free Definition of "Sheathing".*

(Continued)

*Primary Examiner* — Steven T Sawyer
*Assistant Examiner* — Ahmad D Barnes
(74) *Attorney, Agent, or Firm* — GE Global Patent Operation; William S. Munnerlyn (57) ABSTRACT

A method and a system for a mounting device are provided. The mounting device includes at least two shells, each shell having an inner surface and an outer surface wherein the outer surface includes a first banding zone, a second banding zone, and a clamping zone extending between the first banding zone and the second banding zone and a pair of shoulders bounding each of the first banding zone and second banding zone. The mounting device also includes an intermediary material circumscribing the wire bundle including at least one of a substantially non-porous material, a vulcanizing tape, and a silicone material. The mounting device further includes at least one fastener configured to engage the first banding zone or second banding zone to couple the first shell and the second shell to the wire bundle and the intermediary material.

19 Claims, 12 Drawing Sheets

(56) References Cited

U.S. PATENT DOCUMENTS

| | | |
|---|---|---|
| 8,056,346 B2 | 11/2011 | Lockyer et al. |
| 2009/0301758 A1* | 12/2009 | Suzuki ................ B60R 16/0215 |
| | | 174/135 |
| 2010/0258329 A1 | 10/2010 | Engelbach et al. |
| 2011/0030377 A1 | 2/2011 | Lockyer et al. |
| 2013/0111872 A1* | 5/2013 | Young ................ B60R 16/0207 |
| | | 60/39.091 |
| 2013/0168129 A1 | 7/2013 | Cox et al. |

OTHER PUBLICATIONS

The Free Definition of "Non-porous".*
The Free Definition of "Arcuate".*
Non-Final Office Action for U.S. Appl. No. 13/341,326 dated Oct. 25, 2013, 19 pages.
http://www.aircostcontrol.com/?q=202W302-12-0; 1 page.

* cited by examiner

MOUNTING DEVICE AND METHOD OF ASSEMBLING THE SAME

BACKGROUND OF THE DISCLOSURE

The field of this disclosure relates generally to mounting devices and, more particularly, to a mounting device for an electrical harness of a gas turbine engine.

Most known electro-mechanical systems (e.g., automobiles, aircraft, and watercraft) utilize wires as a medium for providing power or communication amongst their components. Because loose and unorganized wires can create a complex and unwieldy wire network throughout a system, similarly situated wires are often bundled together (e.g., in the form of an electrical harness) to facilitate more easily and properly securing the wires in the system, thereby helping to protect the wires from adverse effects (e.g., vibration, abrasion, moisture, heat, etc.) associated with system operation.

Known mounting devices include a heat shrink bobbin constructed from Viton fluoroelastomer, commercially available from the performance elastomers division of E. I. du Pont de Nemours and Company of Wilmington, Del. The bobbin is pulled over the end of a harness, located on the harness, and then heat-shrunk to the harness using a heat gun applying heated air to the bobbin. It would be useful, therefore, to provide a mounting device that can be located on a harness in a manner that does not require the mounting device to be pulled over the end of a harness.

Shrinkage can occur in a harness under certain high temperature situations, causing a mounting device located on and attached to that harness to detach from the harness, allowing the harness to move fore and aft within the harness. It would be useful, therefore, to provide a mounting device that can be attached to a harness in a manner that is not affected by high temperatures, enabling the mounting device to be used in a greater variety of environments.

BRIEF DESCRIPTION OF THE DISCLOSURE

In one aspect, a mounting device for an electrical harness having a wire bundle includes at least two shells, each shell having an inner surface and an outer surface wherein the outer surface includes a first banding zone, a second banding zone, and a clamping zone extending between the first banding zone and the second banding zone and a pair of shoulders bounding each of the first banding zone and second banding zone, each shoulder including a ridge extending outwardly from the outer surface. The mounting device also includes an intermediary material circumscribing the wire bundle, the intermediary material including at least one of a substantially non-porous material, a vulcanizing tape, and a silicone material. The mounting device further includes at least one fastener configured to engage at least one of the first banding zone and second banding zone to couple the first shell and the second shell partially circumscribing the wire bundle and the intermediary material such that movement of the first shell and the second shell along the intermediary material and wire bundle is restricted.

In another aspect, a method of mounting a wire bundle to a mounting clamp coupled to a surface includes wrapping the wire bundle using at least one layer of an intermediary material, an outer surface of an outer layer of intermediary material including an outside diameter, selecting at least two mounting shells from a plurality of available mounting shells, the selected at least two mounting shells including a first banding zone, a second banding zone, and a clamping zone extending between the first banding zone and the second banding zone, the selected at least two mounting shells including a pair of shoulders bounding each of the first banding zone and the second banding zone, each shoulder including a ridge extending outwardly from the outer surface, an inner diameter of the selected at least two mounting shells matching a diameter of the outer surface of the intermediary material, an outer diameter of the selected at least two mounting shells matching an inner diameter of the mounting clamp. The method also includes banding the selected at least two mounting shells to the outer surface of the outer layer of the intermediary material at the banding zones and inserting the banded mounting shells into a jaws arrangement of the mounting clamp.

In still another aspect, an aircraft engine system includes a gas turbine engine, a nacelle at least partially circumscribing the engine, a mounting clamp coupled to a surface the nacelle, a wire harness assembly secured within a jaws arrangement of the mounting clamp, the wire harness assembly including at least two mounting shells coupled to an outer surface of a wire harness using a band circumscribing a banding zone of the at least two mounting shells, the banding zone bounded by a pair of raised ridges extending away from an outer surface of the at least two mounting shells.

DETAILED DESCRIPTION OF THE DISCLOSURE

The following detailed description sets forth a mounting device and a method of assembling the same by way of example and not by way of limitation. The description should clearly enable one of ordinary skill in the art to make and use the mounting device, and the description sets forth several embodiments, adaptations, variations, alternatives, and uses of the mounting device, including what is presently believed to be the best mode thereof. The mounting device is described herein as being applied to a preferred embodiment, namely an electrical harness for a gas turbine engine or a steam turbine. However, it is contemplated that the mounting device and the method of assembling the same may have general application in a broad range of systems other than gas turbine engines (e.g., automobiles, watercraft, spacecraft, etc.) and/or a variety of commercial, industrial, and/or consumer applications other than electrical harnesses (e.g., to mount tubes, hoses, sensors having leads, or ignition leads).

Figure 1:
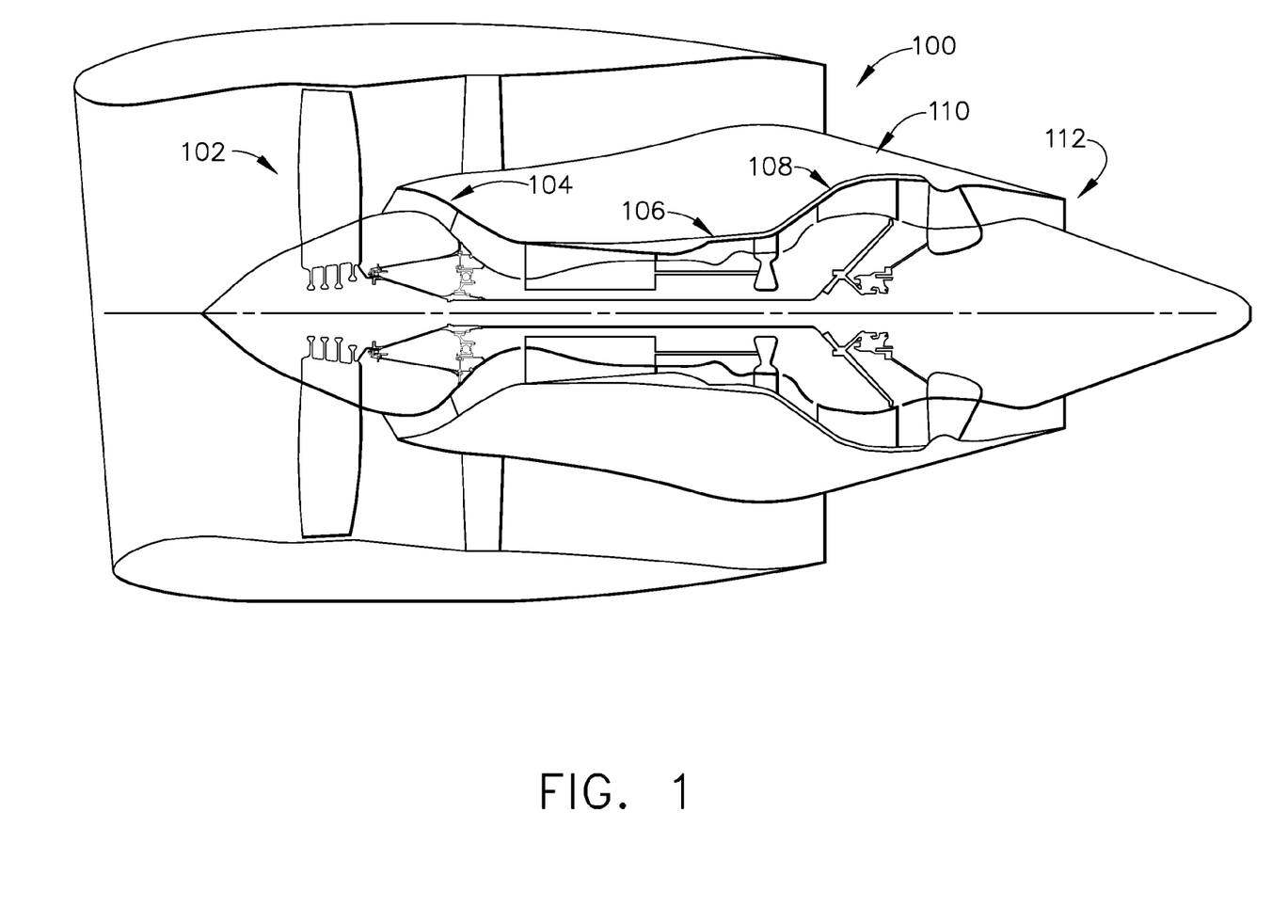
FIG. 1 is a schematic illustration of a gas turbine engine.

FIG. 1 is a schematic illustration of an example gas turbine engine 100 including a fan system 102, a compressor system 104, a combustion system 106, a high pressure turbine system 108, and a low pressure turbine system 110. During operation, ambient air is directed through fan system 102 into compressor system 104, in which the ambient air is compressed and directed into combustion system 106. In combustion system 106, the compressed air is mixed with fuel and ignited to generate combustion gases that are directed through high pressure turbine system 108 and low pressure turbine system 110. The combustion gases are subsequently exhausted from gas turbine engine 100 via an exhaust system 112. In other embodiments, gas turbine engine 100 may include any suitable number of fan systems, compressor systems, combustion systems, and/or turbine systems configured in any suitable manner.

Figure 2:
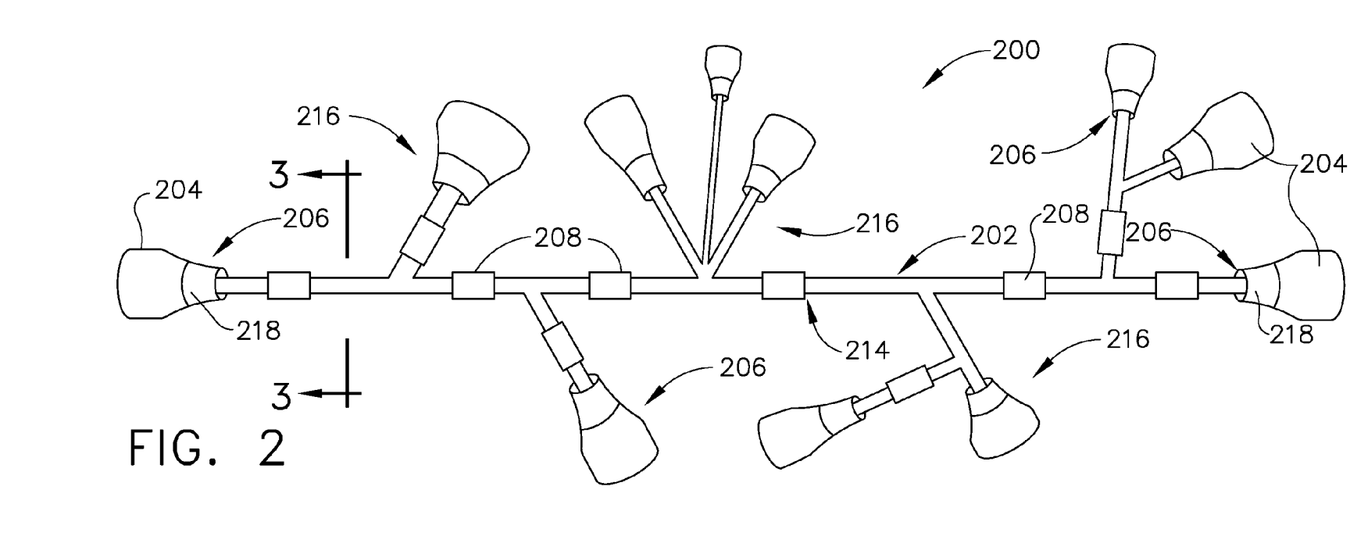
FIG. 2 is a schematic illustration of an electrical harness of the gas turbine engine shown in FIG. 1.
Figure 3:
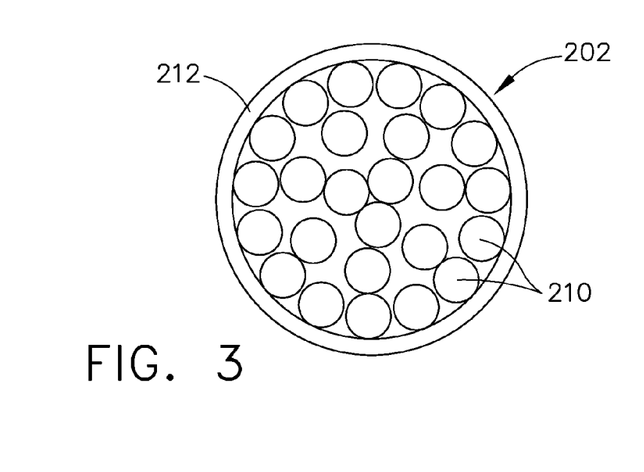
FIG. 3 is a schematic cross-sectional illustration of the electrical harness shown in FIG. 2 and taken along line 3-3.

FIG. 2 is a schematic illustration of an electrical harness 200 for use on, for example, gas turbine engine 100, and FIG. 3 is a schematic cross-sectional illustration of electrical harness 200 taken along line 3-3. In the example embodiment, electrical harness 200 includes a wire bundle 202, a plurality of connector assemblies 204 coupled at ends 206 of wire bundle 202, and a plurality of mounting devices 208 coupled at intermediate locations along wire bundle 202 between ends 206. Wire bundle 202 includes a plurality of wires 210 that, in some instances, are disposed within a covering 212 (e.g., at least one layer of a braided material, a sheath) to facilitate protecting wires 210 from chaffing and/or electromagnetic interference (EMI). Wire bundle 202 has a main segment 214 and a plurality of breakout segments 216 extending from main segment 214, thereby enabling wires 210 to be more easily routed through gas turbine engine 100.

Each connector assembly 204 includes a housing (e.g., a cylindrical back shell 218) and a plurality of electrical pins (not shown) disposed therein such that the housing facilitates protecting and/or supporting an interface between wires 210 and the pins. In the example embodiment, a cross-section of connector assembly 204 (e.g., a diameter of the housing) is larger than a cross-section of wire bundle 202 (e.g., a diameter of covering 212). In other embodiments, connector assembly 204 may have any suitable size and/or shape relative to wire bundle 202. As described in more detail below, mounting devices 208 are coupled to wire bundle 202 (e.g., atop of covering 212) to facilitate mounting electrical harness 200 at desired locations within gas turbine engine 100.

Figure 4:
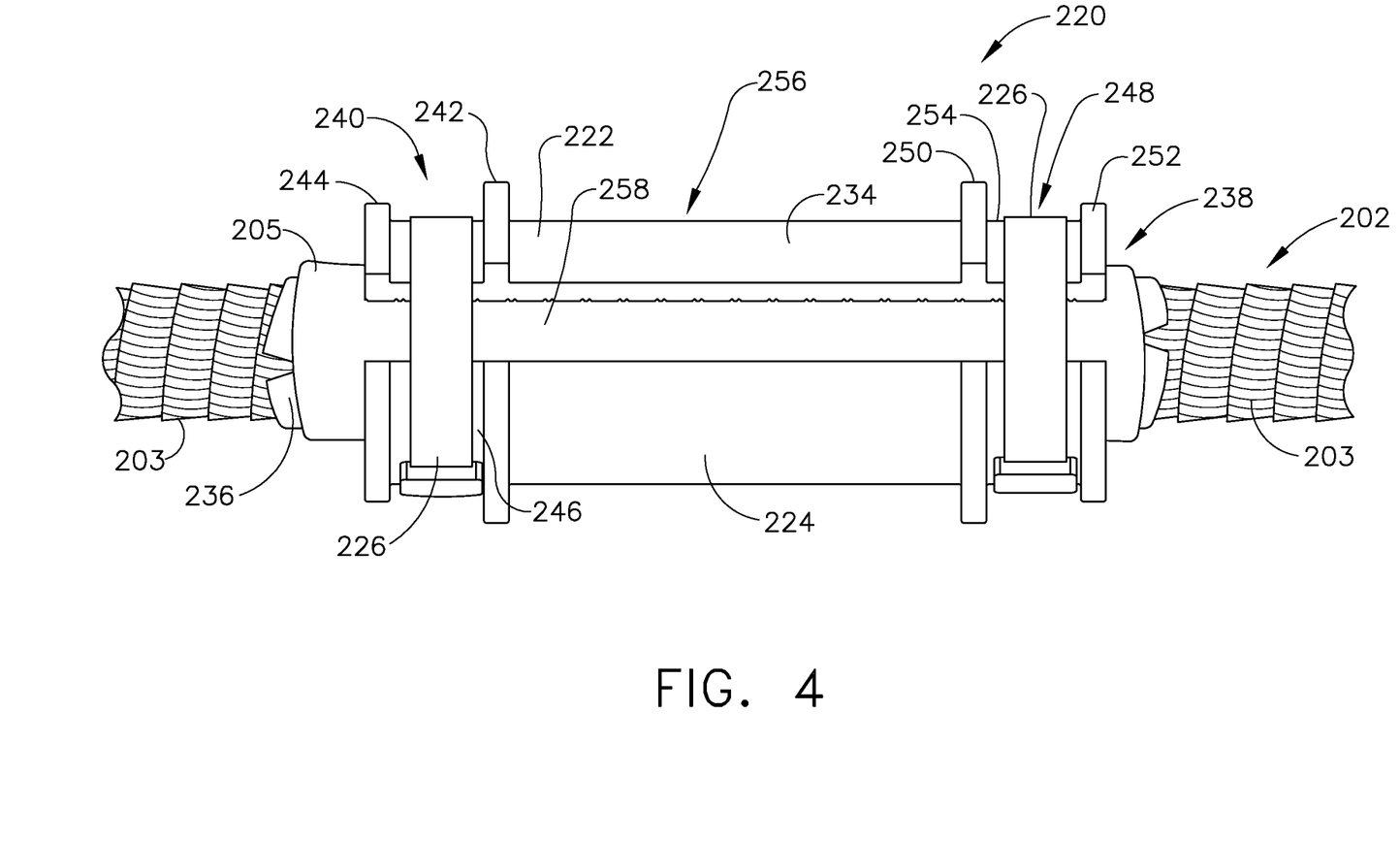
FIG. 4 is a schematic side illustration of a first embodiment of a mounting device of the electrical harness shown in FIG. 2.

FIG. 4 is a side illustration of a mounting device 220 for use on electrical harness 200 in accordance with an example embodiment of the present disclosure. In the example embodiment, mounting device 220 includes a first shell 222, a second shell 224, and at least one fastener 226 (e.g., a pair of annular band straps or zip ties) coupling first shell 222 and second shell 224 about wire bundle 202, as described in more detail below. A vulcanizing tape 205 is wrapped around a shielding tape 203, which is in turn wrapped around covering 212 of wire bundle 202. According to an embodiment, vulcanizing tape 205 can be a black silicone vulcanizing tape that melts under high temperatures. Shielding tape 203 can be a substantially non-porous tape such as a fiberglass tape that prevents vulcanizing tape 205 from vulcanizing into covering 212 of wire bundle 202. By using shielding tape 203, vulcanized vulcanizing tape 205 can be removed from wire bundle 202 by removing the shielding tape, allowing for maintenance to wire bundle 202 underneath.

Figure 5:
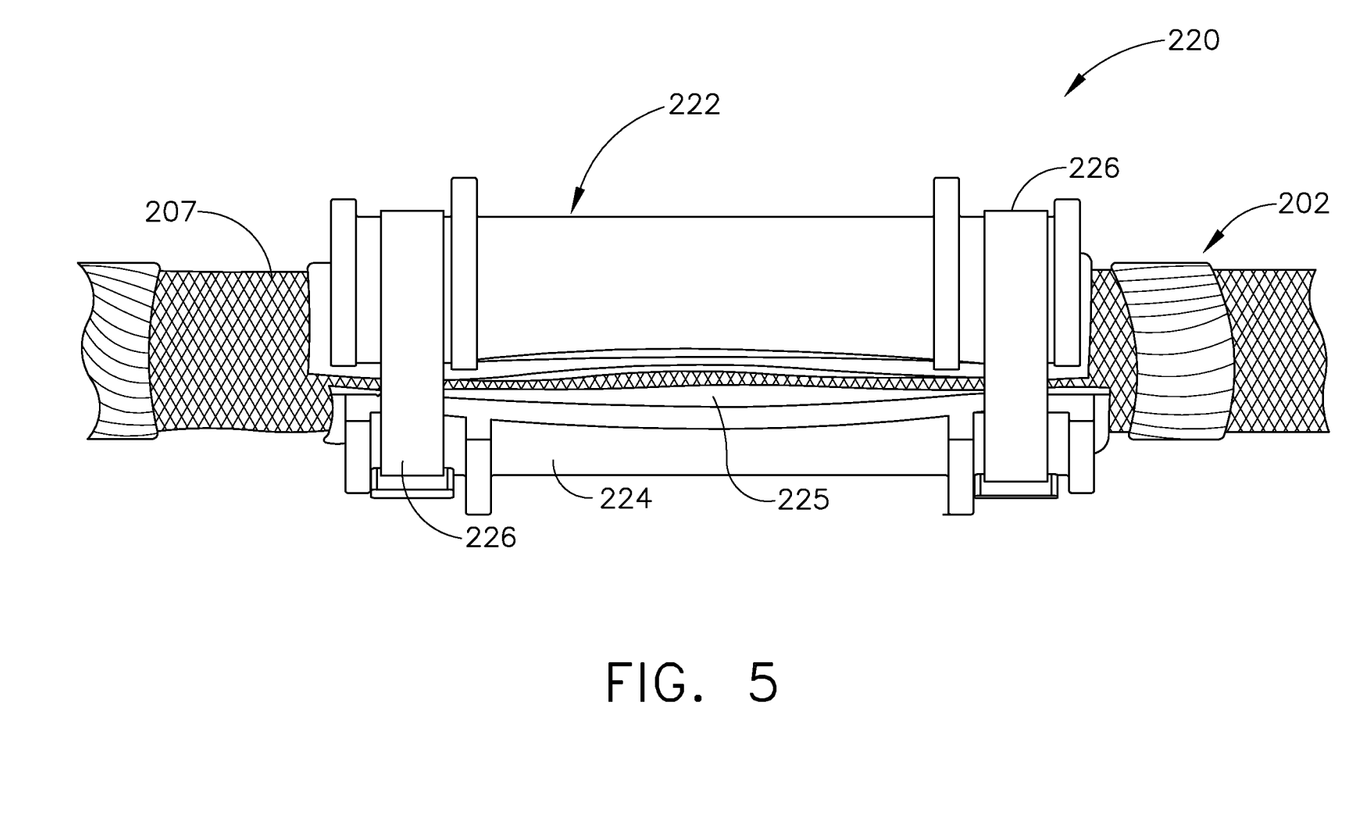
FIG. 5 is a schematic side illustration of a second embodiment of a mounting device of the electrical harness shown in FIG. 2.

FIG. 5 is a side illustration of a second embodiment of mounting device 220 of electrical harness 200 shown in FIG. 2. In this alternative embodiment, a buffer 225 is placed between covering 207 of wire bundle 202 and mounting device 220. According to an embodiment, buffer 225 is a substantially flexible material such as non-vulcanizing silicon (e.g., blue silicon), having a melting point greater than 500 degrees Fahrenheit. The use of a buffer 225 maintains the clamping force exerted on wire bundle 202 by mounting device 220 in high temperatures, preventing fore and aft movement of wire bundle 202. Other types of intermediary materials, such as materials that melt and become thinner due to the heat of engine operation, would allow wire bundle 202 to move fore and aft through mounting device 220.

To couple mounting device 220 to wire bundle 202, first and second shells 222, 224 are seated against wire bundle 202. According to the embodiments shown in FIGS. 4 and 5, a buffer 225 or a combination of shielding tape 203 and vulcanizing tape 205 (e.g., an intermediary material) can be positioned between wire bundle 202 and mounting device 220. Fasteners 226 are then coupled relatively loosely about first and second shells 222, 224 on fastener seats 246, 254 (e.g., first shell 222 and second shell 224 are maintained in contact with wire bundle 202 (or intermediary material) but are slidable together along wire bundle 202 (or intermediary material)). Fasteners 226 are then tightened such that first shell 222 and second shell 224 are displaced toward one another such that first shell 222 and second shell 224 are no longer slidable along wire bundle 202 (e.g., first shell 222 and second shell 224 are displaced toward one another in order to compress wire bundle 202 (or intermediary material) such that the compression forces restrict movement of first shell 222 and second shell 224 along wire bundle 202). Because fasteners 226 are seated on fastener seats 246, 254 between first ribs 242, 244 and second ribs 250, 252, respectively, fasteners 226 are restricted from moving along wire bundle 202 relative to first shell 222 and second shell 224. It should also be noted that for all embodiments described herein, while first shell 222 and second shell 224 are described as being configured for coupling to wire bundle 202 using mechanical fasteners 226, an adhesive disposed between shells 222, 224 and wire bundle 202 may be used in lieu of, or in addition to, fasteners 226 to facilitate securing shells 222, 224 to wire bundle 202.

After mounting device 220 is coupled to wire bundle 202 in the manner described above, mounting device 220 may be coupled to gas turbine engine 100 by being engaged within a fastening mechanism (e.g., a broom clip, clam shell clip, or p-clamp) that is fixed to a suitable surface of gas turbine engine 100 (e.g., a casing of gas turbine engine 100) such that the fastening mechanism of gas turbine engine 100 is seated against mounting seat 258 between inner first and second ribs 242, 250. Because the fastening mechanism is coupled to mounting device 220 between inner first and second ribs 242, 250, mounting device 220 is restricted from moving relative to the fastening mechanism, thereby fixing electrical harness 200 at desired location(s) on gas turbine engine 100 during operation.

Figure 6:
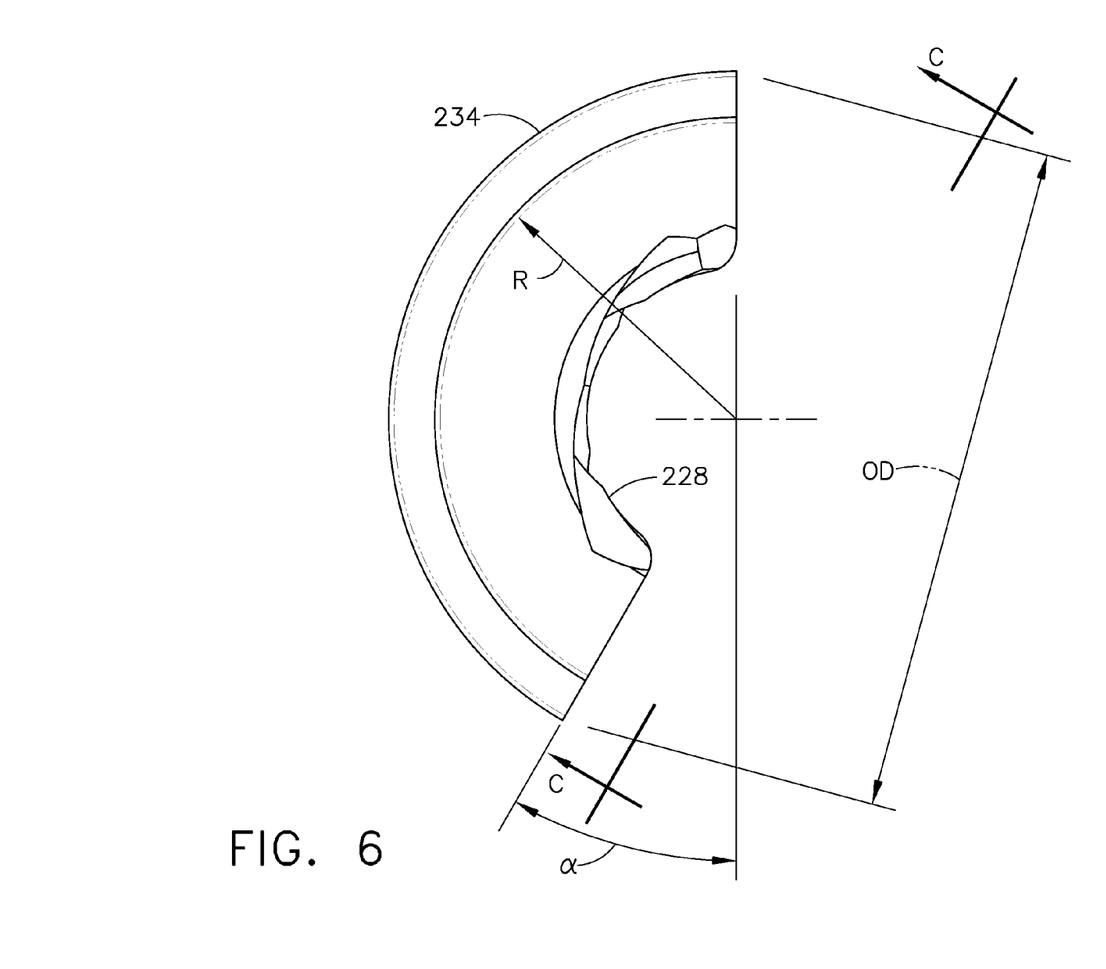
FIG. 6 is a schematic cross-sectional illustration of a portion of the mounting devices shown in FIGS. 4 and 5.

FIG. 6 is a schematic cross-sectional illustration of a portion of the mounting devices shown in FIGS. 4 and 5. In the example embodiment, first shell 222 and second shell 224 are generally semi-cylindrically shaped (i.e., first shell 222 and second shell 224 have inner surfaces 228 (shown in FIGS. 6, 11, 15a and 15b) that are generally arcuate and less than 180 degrees in cross-section) such that, when coupled together, first shell 222 and second shell 224 form a generally cylindrical shape that is sized to receive wire bundle 202. According to an embodiment, each of first shell 222 and second shell 224 can be shaped approximately 30 degrees less than the 180 degrees of a semicircle to allow one size of a mounting device 220 to be used on a variety of wire bundle 202 diameters. According to other embodiments, each of each of first shell 222 and second shell 224 can be shaped any number of degrees less than the 180 degrees of a semicircle.

Figure 7:
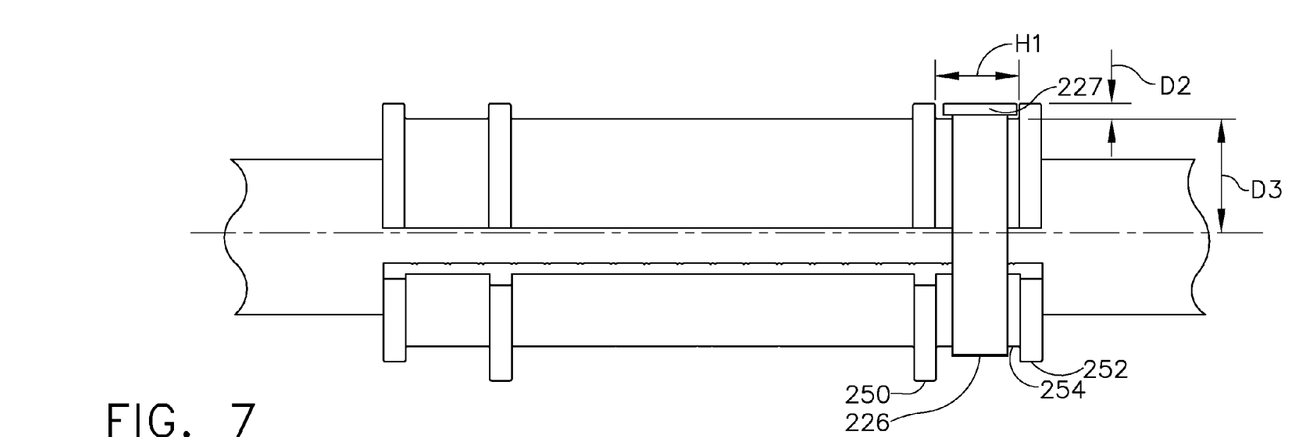
FIG. 7 is a schematic side illustration of an embodiment of a mounting device of the electrical harness shown in FIG. 2, having fastener channels with internal and external collars that protrude an equal distance from the surface of the grommet.
Figure 8:
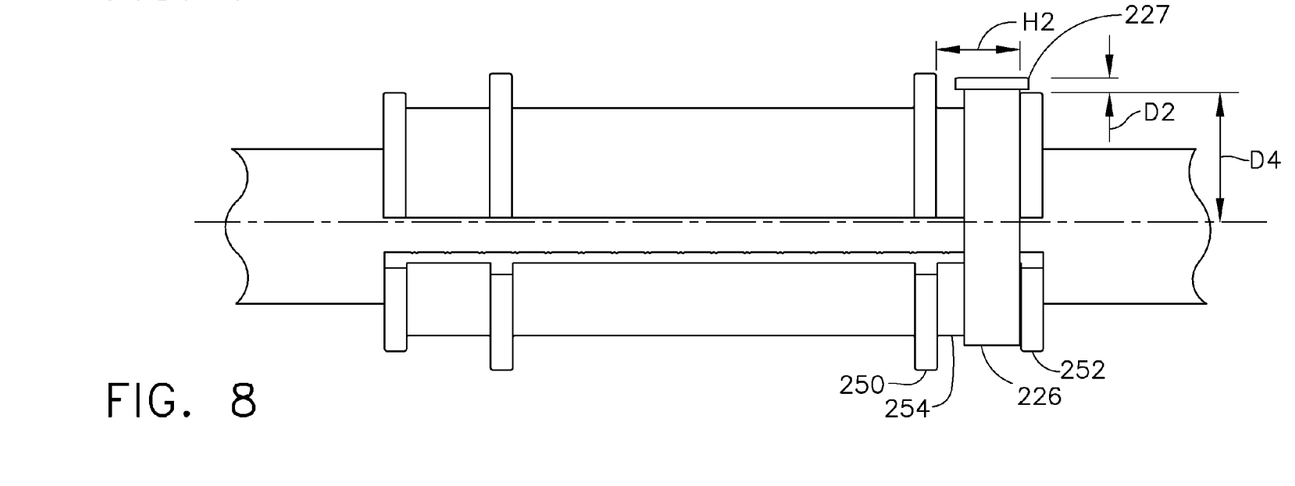
FIG. 8 is a schematic side illustration of a third embodiment of a mounting device of the electrical harness shown in FIG. 2, having fastener channels with internal and external collars that protrude varying distances from the surface of the grommet.

FIG. 7 is a schematic side illustration of an embodiment of mounting device 220 of electrical harness 200 shown in FIG. 2, having shoulders 240, 248 with inner ribs 242, 250 and outer ribs 244, 252 that protrude an equal distance from outer surface 234, according to an embodiment. FIG. 8 is a schematic side illustration of a third embodiment of mounting device 220 of electrical harness 200 shown in FIG. 2, having shoulders 240, 248 with inner ribs 242, 250 and outer ribs 244, 252 that protrude varying distances from outer surface 234. In the example embodiment, each of first shell 222 and second shell 224 has an outer surface 234 that is segmented into a first end region 236, a second end region 238, and a middle region 256. Each first end region 236 includes a first shoulder 240 having inner and outer first ribs 242, 244 that are spaced apart to define between them a first fastener seat 246. Similarly, each second end region 238 includes a second shoulder 248 having inner and outer second ribs 250, 252 that are spaced apart to define between them a second fastener seat 254. Extending from first end region 236 to second end region 238 is middle region 256. Horizontal width H1 of second fastener seat 254 is greater than width H2. By reducing the width of second fastener seat 254 (and corresponding first fastener seat 246 (shown in FIG. 4)), the overall width of mounting device 220 can be reduced, facilitating placement of mounting device 220 in environments filled with other components. In order to reduce width H1 to width H2 significantly, height D3 of outer rib 252 is reduced by a height D2, so that a portion of fastener clip 227 can extend past outer rib 252. A height D4 of outer rib 252 remains sufficient to prevent fastener 226 from sliding out of second fastener seat 254.

Figure 9:
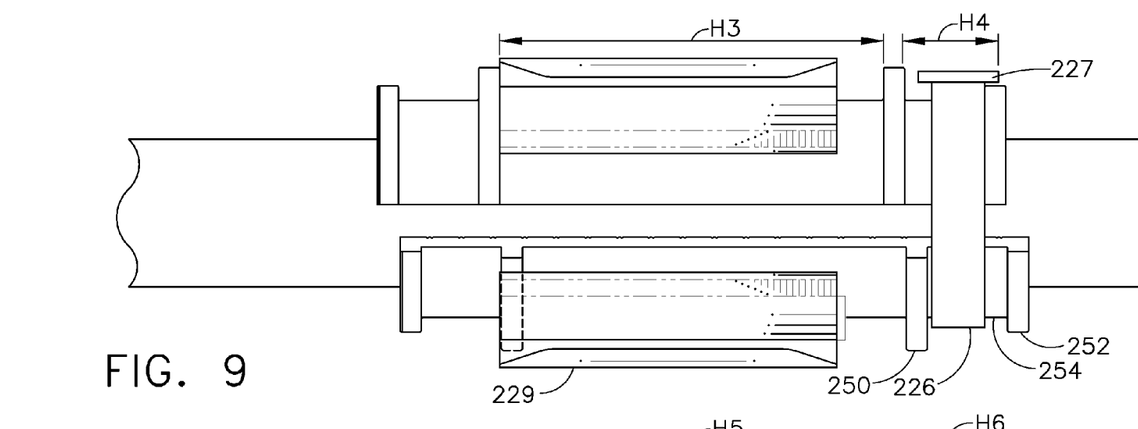
FIG. 9 is a schematic side illustration of an embodiment of a mounting device of the electrical harness shown in FIG. 2, having a clamping zone of conventional width.
Figure 10:
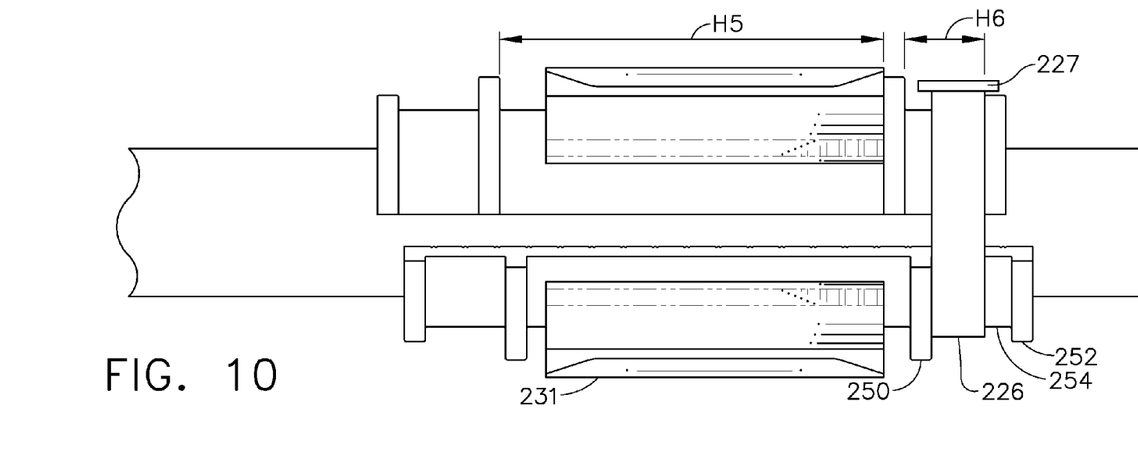
FIG. 10 is a schematic side illustration of a fourth embodiment of a mounting device of the electrical harness shown in FIG. 2, having a wide clamping zone.

FIG. 9 is a schematic side illustration of an embodiment of mounting device 220 of electrical harness 200 shown in FIG. 2, having a first clamping zone 229. FIG. 10 is a schematic side illustration of a fourth embodiment of mounting device 220 of electrical harness 200 shown in FIG. 2, having a second clamping zone 231 with a greater width H5 than width H3 of first clamping zone 229. In the event that first shell 222 and second shell 224 are offset slightly during installation, it is desirable that a clamp may be placed around middle region 256 (shown in FIG. 4) without requiring the installer to separate and reposition the first and second shells 222, 224 so that they substantially line up. To facilitate this activity, first clamping zone 229 of middle region 256 can be widened by moving inner ribs 242, 250 in the direction of outer ribs 244, 252 such that width H4 is reduced to width H6, and fastener clip 227 of fastener 226 is positioned so that a portion of fastener clip 227 extends past outer rib 252. By horizontally moving inner ribs 242, 250 toward outer ribs 244, 252, width H3 of middle region 256 increases to width H5, and the wider second clamping zone 231 of middle region 256 is available to the installer for greater flexibility in clip (not shown) placement.

Figure 11:
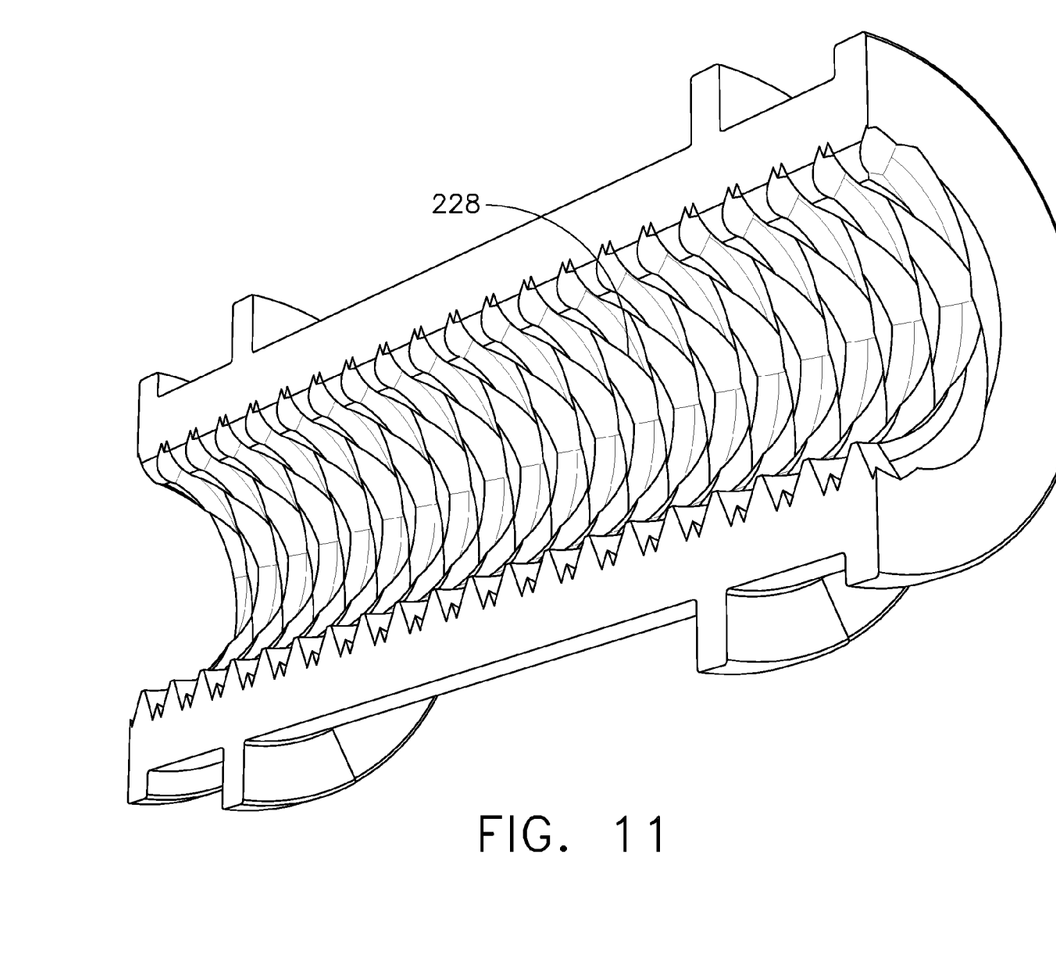
FIGS. 11 and 12 are schematic isometric illustrations of a portion of a fifth embodiment of a mounting device of the electrical harness shown in FIG. 2, having a knurled interior surface.
Figure 12:
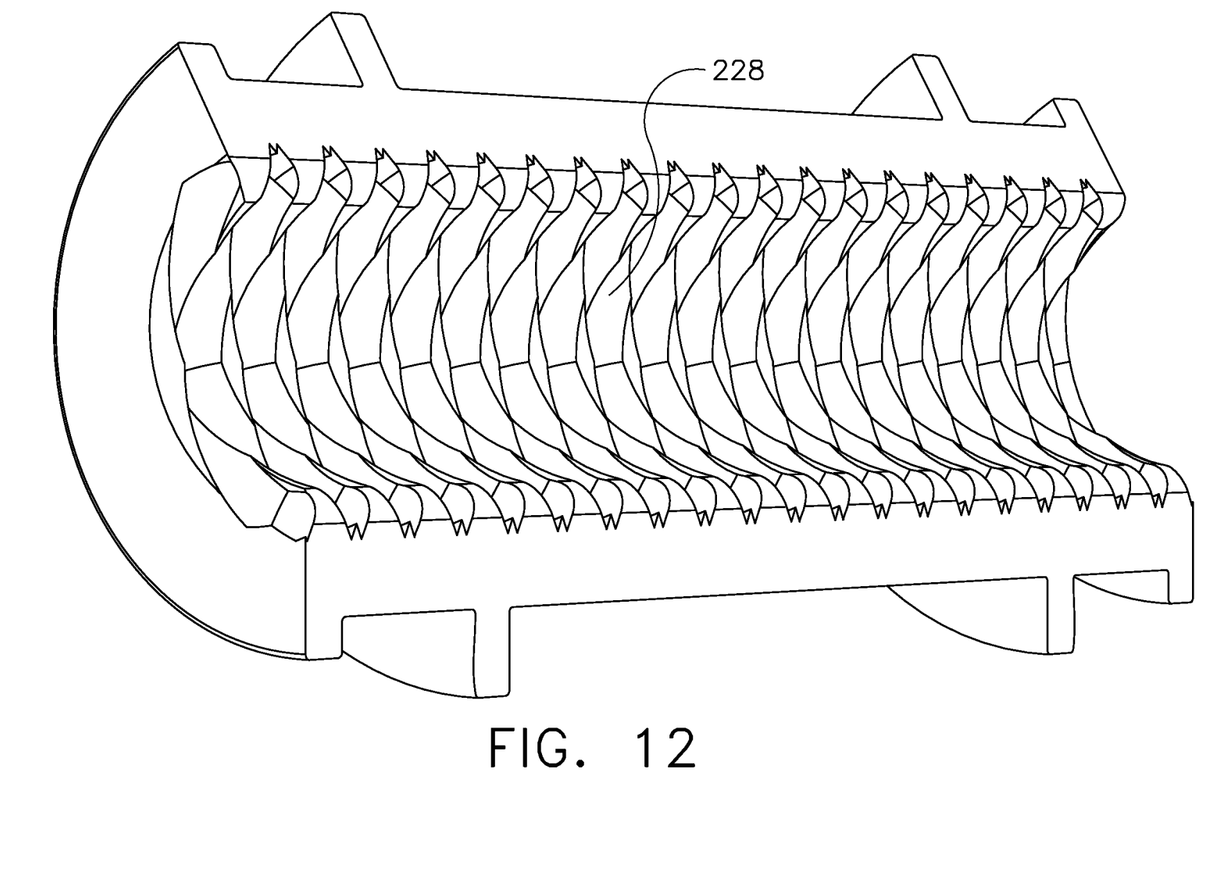
Figure 13A:
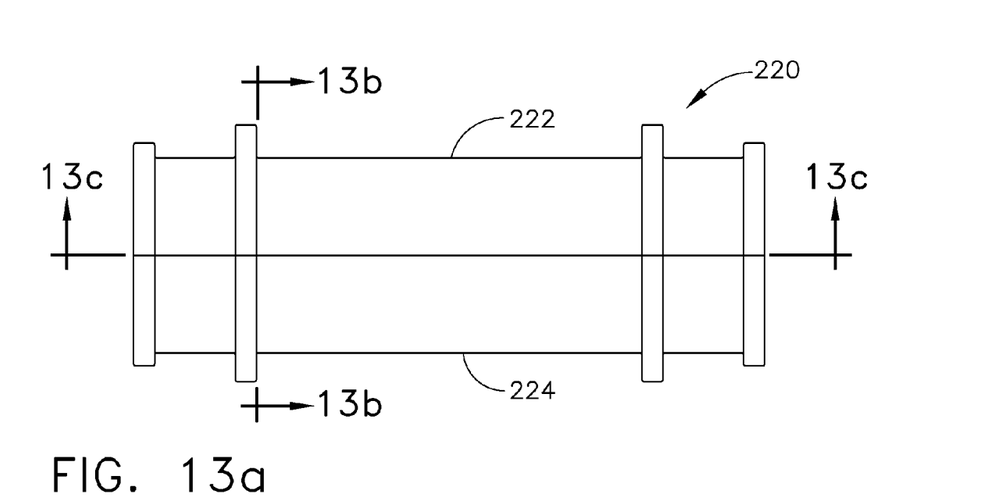
FIG. 13a is a schematic cross-sectional illustration of the mounting devices shown in FIGS. 11 and 12.
Figure 13B:
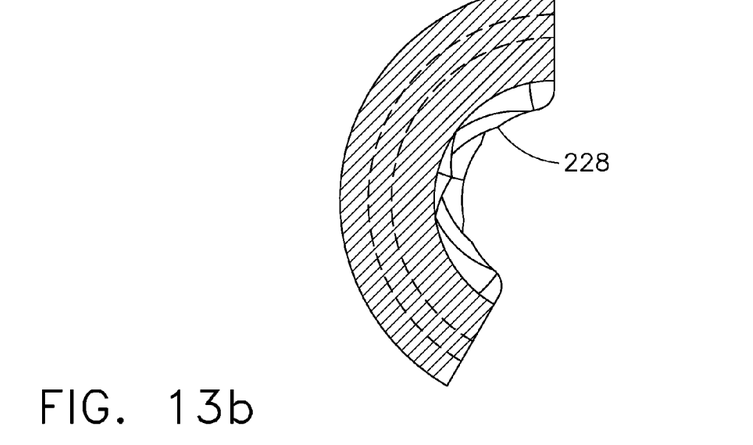
FIG. 13b is a schematic side illustration of the fifth embodiment of a mounting device of the electrical harness shown in FIG. 2.
Figure 13C:
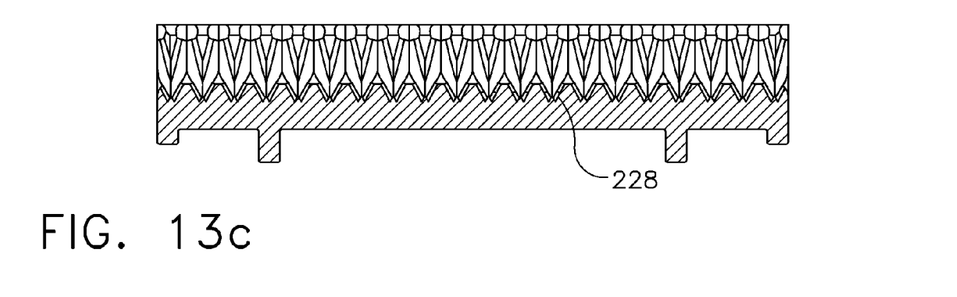
FIG. 13c is a schematic cross-sectional illustration of the mounting device shown in FIG. 13b taken along line 13-13.
Figure 14:
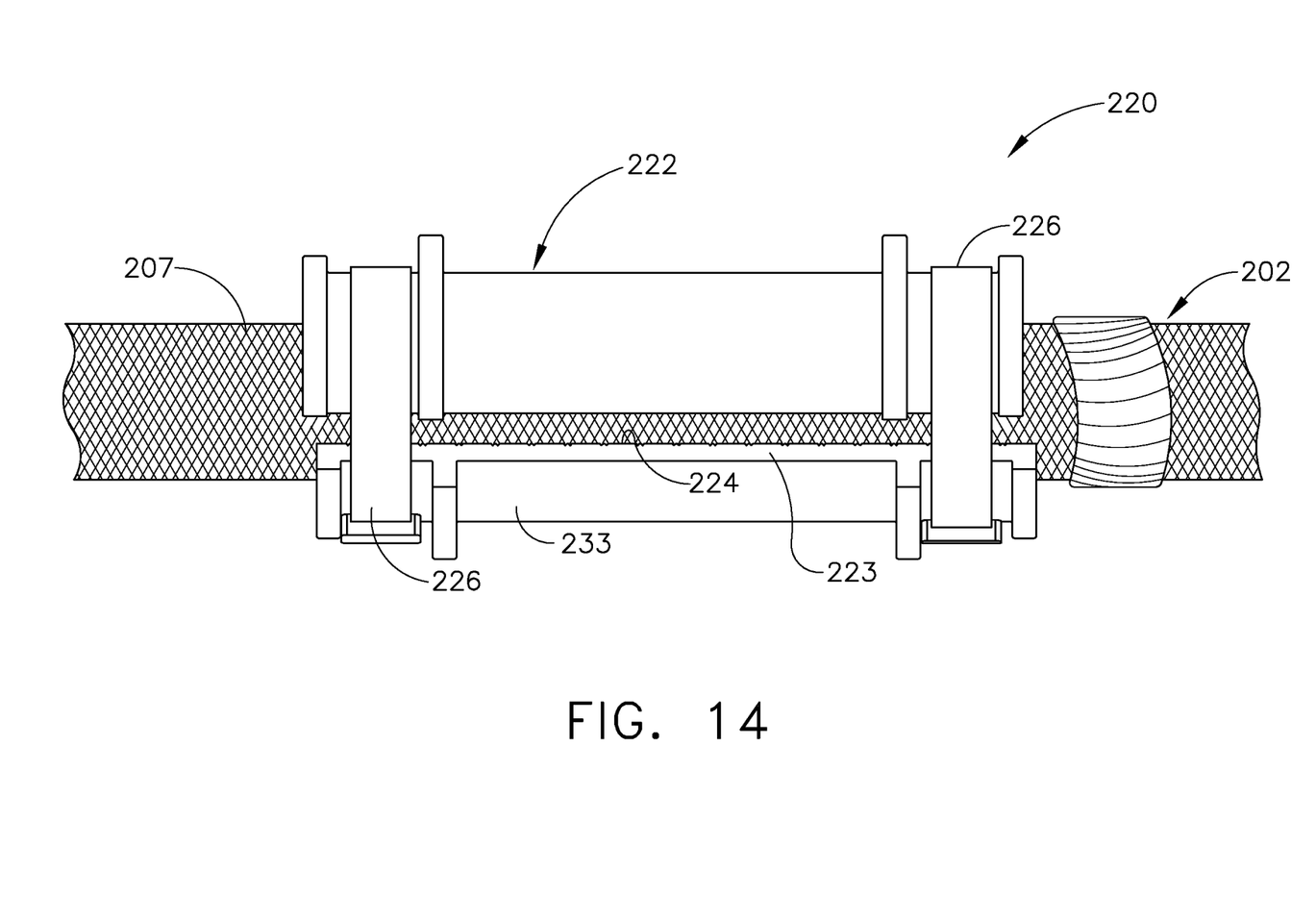
FIG. 14 is a schematic side illustration of the fifth embodiment of the mounting device of the electrical harness shown in FIG. 2.

FIGS. 11 and 12 are isometric illustrations of a portion of a fifth embodiment of mounting device 220 of the electrical harness 200 shown in FIG. 2, having contours on the inner surface. FIG. 11 illustrates mounting device 220 having a cross-sectional arc of less than 180 degrees. FIG. 12 illustrates mounting device 220 having a cross-sectional arc of approximately 150 degrees. The faces of the edges of mounting device 220 may be coincident with a radial plane of the arc or may be formed parallel to a chord of the arc. FIG. 13a is a schematic cross-sectional illustration of mounting devices 220 shown in FIGS. 11 and 12. FIG. 13b is a schematic side illustration of the fifth embodiment of mounting device 220. FIG. 13c is a schematic cross-sectional illustration of mounting device 220 shown in FIG. 13b taken along line 13-13. FIG. 14 is a side illustration of the fifth embodiment of mounting device 220 of electrical harness 200 shown in FIGS. 11 and 12. According to this embodiment, inner surfaces 228 may have contours that vary along wire bundle 202 to facilitate an improved grip of first shell 222 and second shell 224 on wire bundle 202 (e.g., inner surfaces 228 may have at least one protuberance 233, such as an arcuately extending ridge, that facilitates gripping wire bundle 202).

Figure 15A:
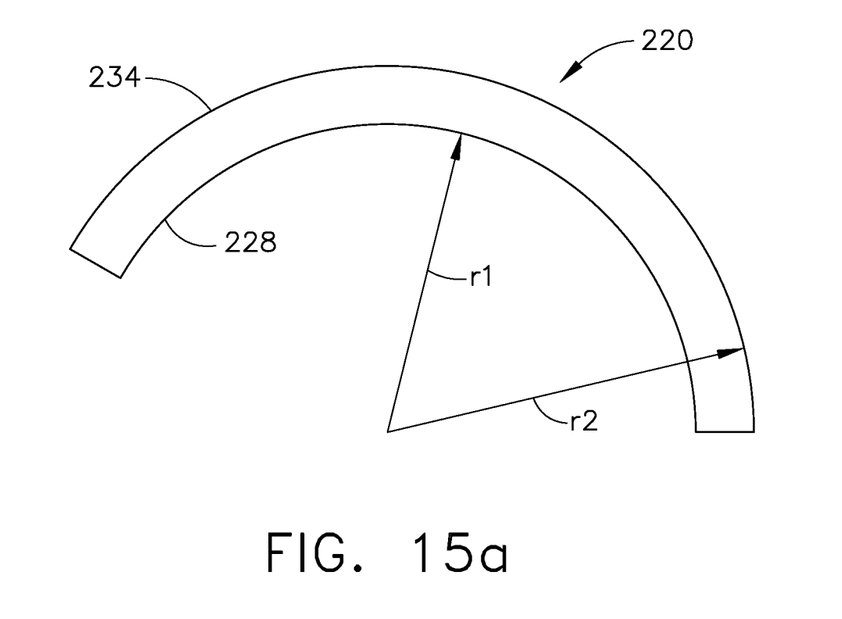
FIG. 15a is a schematic end view of a sixth embodiment of a mounting device of the electrical harness shown in FIG. 2, having a narrow outer wall thickness.
Figure 15B:
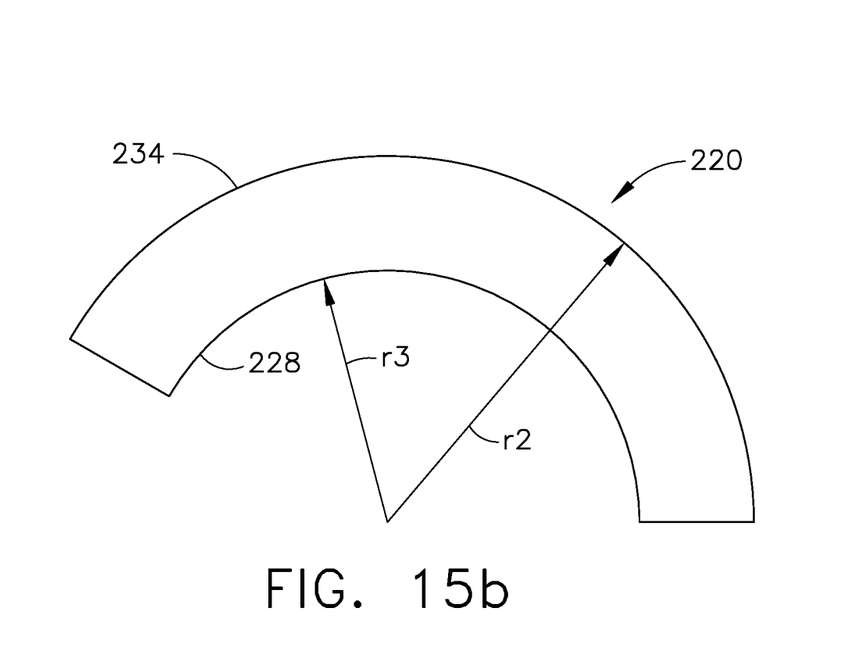
FIG. 15b is a schematic end view of a seventh embodiment of a mounting device of the electrical harness shown in FIG. 2, having a thick outer wall thickness.

FIG. 15a is a schematic end view of a sixth embodiment of mounting device 220 of electrical harness 200 shown in FIG. 2, having a narrow outer wall thickness and an interior radius R1. FIG. 15b is a schematic end view of a seventh embodiment of mounting device 220 of electrical harness 200 shown in FIG. 2, having a thick outer wall thickness and a comparatively smaller (than radius R1) interior radius R3. By maintaining a uniform exterior radius R2 and varying the interior diameter of the mounting device 220, a common size clip (not shown) can be used to retain wire bundles 202 of differing diameters. This would minimize variation amongst the fastening mechanisms (e.g., broom clips) of gas turbine engine 100 while allowing for variation in the diameter of wire bundle 202, thereby resulting in more uniformity and reduced costs associated with the fastening mechanisms of gas turbine engine 100.

The methods and systems described herein facilitate providing a mounting device that can be arranged on an electrical harness in a manner that is less influenced by the configuration of connector assemblies of the electrical harness. The methods and systems described herein also facilitate providing a mounting device with restricted fore and aft movement along a wire bundle of an electrical harness. The methods and systems described herein further facilitate providing a mounting device that is more durable in higher temperature applications. The methods and systems described herein further facilitate providing an improved fit between an electrical harness and fastening system of the engine, and further facilitate a reduction in engine fastening system sizes needed to mount an electrical harness by compensating for harness bundle diameter variation while maintaining fastening system interface dimensioning. The methods and systems described herein therefore facilitate reducing time and costs associated with manufacturing, installing, and maintaining mounting devices.

Example embodiments of a mounting device and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only electrical harnesses of gas turbine engines as described herein. Rather, the present disclosure can be implemented and utilized in connection with many other industries.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A mounting device for an electrical harness having a wire bundle, said mounting device comprising:
   at least two shells, each shell having a first end and a second end, and an inner surface and an outer surface, said outer surface comprising:
     a first fastener seat proximate to the first end of the at least two shells;
     a second fastener seat proximate to the second end of the at least two shells;
     a clamping zone extending between said first fastener seat and said second fastener seat;
     a first ridge extending outwardly from the outer surface between the first fastener seat and the clamping zone; and
     a second ridge extending outwardly from the outer surface between the first fastener seat and the clamping zone;
   an intermediary material circumscribing the wire bundle, said intermediary material comprising at least one of a substantially non-porous material, a vulcanizing tape, or a silicone material; and
   at least one fastener configured to engage at least one of said first fastener seat or said second fastener seat to couple said first shell and said second shell partially circumscribing the wire bundle and the intermediary material such that movement of said first shell and said second shell along the intermediary material and wire bundle is restricted.

2. The device of claim 1, wherein the shells each comprise a substantially arcuate cross-section with an angle less than about 180 degrees.

3. The device of claim 2, wherein the shells each comprise a substantially arcuate cross-section with an angle less than about 160 degrees.

4. The device of claim 2, wherein the shells each comprise a substantially arcuate cross-section with an angle between about 150 degrees and about 160 degrees.

5. The device of claim 1, wherein the inner surface of at least one of the shells comprises a plurality of protuberances extending outwardly from the surface, the protuberances configured to grip the wire bundle and the intermediary material when the protuberances are placed in contact with the wire bundle and the intermediary material.

6. The device of claim 1, wherein the wire bundle comprises a plurality of wires extending through the mounting device substantially parallelly with respect to each other, the plurality of protuberances comprising knurled ridges that align non-parallelly with respect to the plurality of wires.

7. The device of claim 6, wherein the plurality of protuberances comprise a first plurality of spaced-apart knurled ridges aligned in a first direction and a second plurality of spaced-apart knurled ridges aligned in a second direction, the second direction being different than the first direction.

8. The device of claim 1, further comprising a third ridge extending outwardly from the outer surface and bounding the first fastener seat on the first edge.

9. The device of claim 8, wherein at least one of the first ridge or third ridge has a height that is greater than the other.

10. The device of claim 1, wherein said clamping zone is configured to receive a mounting clamp, the mounting clamp having a width, said clamping zone including a length in a direction parallel to the wires that is greater than the width of the mounting clamp.

11. The device of claim 10, wherein the at least two shells are selected to have an inner diameter that matches an outer diameter of the wire bundle and intermediary material and an outer diameter that matches an inner diameter of the mounting clamp.

12. The mounting device of claim 1, wherein the mounting device is
   coupled to a surface of a nacelle.

13. The system of claim 12, further comprising an intermediary material circumscribing the wire bundle between the wire bundle and the at least two mounting shells, said intermediary material comprising at least one of a substantially non-porous material, a vulcanizing tape, or a silicone material.

14. The system of claim 12, wherein each of the at least two mounting shells comprises a substantially arcuate cross-section with an angle less than about 180 degrees.

15. The system of claim 14, wherein the shells each comprise a substantially arcuate cross-section with an angle between about 150 degrees and about 160 degrees.

16. The system of claim 12, wherein a concave radially inner surface of at least one of the at least two mounting shells comprises a plurality of protuberances extending outwardly from the surface, the protuberances configured to grip the wire bundle and the intermediary material when the protuberances are placed in contact with the wire bundle and the intermediary material.

17. The system of claim 16, wherein the wire bundle comprises a plurality of wires extending through the mounting device substantially parallelly with respect to each other, the plurality of protuberances comprising knurled ridges that align non-parallelly with respect to the plurality of wires.

18. The system of claim 12, wherein one raised ridge of the pair of raised ridges includes a height that is less than a height of the other raised ridge of the same pair of raised ridges.

19. A method of mounting a wire bundle to a mounting clamp coupled to a surface, the method comprising:
- wrapping the wire bundle using at least one layer of an intermediary material, an outer surface of an outer layer of intermediary material comprising an outside diameter;
- placing at least two shells having an inner diameter corresponding to the outer diameter of the outer surface around the wire bundle, wherein the at least two shells each have a first and second end, and include:
  - a first fastener seat proximate to the first end of the at least two shells, and
  - a second fastener seat proximate to the second end of the at least two shells;
  - a clamping zone extending between said first fastener seat and said second fastener seat;
  - a first ridge extending outwardly from the outer surface between the first fastener seat and the clamping zone; and
  - a second ridge extending outwardly from the outer surface between the first fastener seat and the clamping zone; and
- fastening the at least two shells together by applying a fastener around at least one of the first and second fastener seat; and
- inserting the fastened mounting shells into a jaws arrangement of the mounting clamp.

* * * * *